United States Patent
Veerasamy (12) 
(10) Patent No.: US 6,326,067 B1
(45) Date of Patent: Dec. 4, 2001

(54) VACUUM IG PILLAR WITH DLC COATING

(75) Inventor: Vijayen S. Veerasamy, Farmington Hills, MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/303,550

(22) Filed: May 3, 1999

(51) Int. Cl.[7] .............................. E06B 3/24; D02G 3/00
(52) U.S. Cl. ........................ 428/34; 428/120; 428/368; 428/375; 52/786.13
(58) Field of Search .............................. 428/34, 120, 366, 428/367, 368, 375, 119; 52/786.13

(56) References Cited

U.S. PATENT DOCUMENTS

| | | |
|---|---|---|
| 49,167 | 1/1865 | Stetson . |
| 1,370,974 | 3/1921 | Kirlin . |
| 1,448,351 | 3/1923 | Kirlin . |
| 1,774,860 | 9/1930 | Wendler et al. . |
| 2,011,557 | 8/1935 | Anderegg . |
| 2,303,897 | 12/1942 | Smith . |
| 2,962,409 | 11/1960 | Ludlow et al. . |
| 3,441,924 | 4/1969 | Peek et al. . |
| 3,742,600 | 7/1973 | Lowell . |
| 3,857,161 | 12/1974 | Hutchins, IV . |
| 3,902,883 | 9/1975 | Bayer . |
| 3,912,365 | 10/1975 | Lowell . |
| 3,936,553 | 2/1976 | Rowe . |
| 3,990,201 | 11/1976 | Falbel . |
| 4,064,300 | 12/1977 | Bhangu . |
| 4,130,408 | 12/1978 | Crossland et al. . |
| 4,130,452 | 12/1978 | Indri . |
| 4,305,982 | 12/1981 | Hirsch . |
| 4,514,450 | 4/1985 | Nowobilski et al. . |
| 4,683,154 | 7/1987 | Benson et al. . |
| 4,786,344 | 11/1988 | Beuther . |
| 4,824,215 | 4/1989 | Joseph et al. . |
| 4,828,728 | 5/1989 | Dimigen et al. . |
| 4,853,264 | 8/1989 | Vincent et al. . |
| 4,874,461 | 10/1989 | Sato et al. . |
| 4,924,243 | 5/1990 | Sato et al. . |
| 4,928,448 | 5/1990 | Phillip . |
| 4,983,429 | 1/1991 | Takayanagi et al. . |

(List continued on next page.)

FOREIGN PATENT DOCUMENTS

| | | |
|---|---|---|
| 2520062 | 11/1976 | (DE) . |
| 2951330 | 7/1981 | (DE) . |
| 0047725 | 12/1985 | (EP) . |
| 0 421 239 A2 | 4/1991 | (EP) . |
| 0489042 | 6/1992 | (EP) . |
| 0645516 | 3/1995 | (EP) . |
| 7424197 | 9/1973 | (FR) . |
| 8012696 | 6/1980 | (FR) . |
| 2 482 161 | 11/1981 | (FR) . |
| WO 95/01493 | 1/1995 | (WO) . |
| WO 96/12862 | 5/1996 | (WO) . |
| WO 98/04802 | 2/1998 | (WO) . |
| WO980480 | 2/1998 | (WO) . |

OTHER PUBLICATIONS

"Temperature—Induced Stresses in Vacuum Glazing: Modelling and Experimental Validation" By Simko, et al., Solar Energy vol. 63, No. 1, pp. 1–21, 1998.

(List continued on next page.)

*Primary Examiner*—Donald J. Loney
(74) *Attorney, Agent, or Firm*—Nixon & Vanderhye P.C.

(57) ABSTRACT

A vacuum insulating glass (IG) unit is provided with an array of pillars or supports between opposing glass sheets. At least some of the pillars are coated on at least one surface thereof with a dry lubricant material such as diamond like carbon (DLC). This coating permits the glass sheet(s) to move relative to one another during thermal expansion while minimizing the degree to which the pillars scratch or crack the glass during such relative movement. The provision of such coating(s) minimizes pillar scratching of the glass and/or pillars inducing indentations in the glass substrate(s).

17 Claims, 4 Drawing Sheets

U.S. PATENT DOCUMENTS

| | | |
|---|---|---|
| 5,027,574 | 7/1991 | Phillip . |
| 5,124,185 | 6/1992 | Kerr et al. . |
| 5,157,893 | 10/1992 | Benson et al. . |
| 5,234,738 | 8/1993 | Wolf . |
| 5,247,764 | 9/1993 | Jeshurun et al. . |
| 5,270,084 | 12/1993 | Parker . |
| 5,271,973 | 12/1993 | Huether . |
| 5,315,797 | 5/1994 | Glover et al. . |
| 5,399,406 | 3/1995 | Matsuo et al. . |
| 5,489,321 | 2/1996 | Tracy et al. . |
| 5,494,715 | 2/1996 | Glover . |
| 5,499,128 | 3/1996 | Hasegawa et al. . |
| 5,596,981 | 1/1997 | Soucy . |
| 5,657,607 | 8/1997 | Collins et al. . |
| 5,664,395 | 9/1997 | Collins et al. . |
| 5,739,882 | 4/1998 | Shimizu et al. . |
| 5,753,069 | 5/1998 | Rueckheim . |
| 5,891,536 | 4/1999 | Collins et al. . |
| 5,897,927 | 4/1999 | Tsai et al. . |
| 5,902,652 | 5/1999 | Collins et al. . |
| 6,049,370 | 4/2000 | Smith, Jr. et al. . |
| 6,083,578 * | 7/2000 | Collins et al. .................. 428/34 |

OTHER PUBLICATIONS

"Manufacture and Cost of Vacuum Glazing" By Garrison, et al., Solar Energy vol. 55, No. 3, pp. 151–161, 1995.

"Tetrahedral Amorphous Carbon Deposition, Characterisation and Electronic Properties" By Veerasamy, Univ. of Cambridge, Jul., 1994.

* cited by examiner

VACUUM IG PILLAR WITH DLC COATING

This invention relates to a vacuum insulating glass (IG) unit. More particularly, this invention relates to a pillar for use in a vacuum IG window unit wherein the pillar includes a dry lubricant coating of a low friction material such as diamond-like carbon (DLC).

BACKGROUND OF THE INVENTION

Vacuum IG units are known in the art. For example, see U.S. Pat. Nos. 5,664,395 and 5,657,607, the disclosures of which are both hereby incorporated herein by reference.

Figure 1:
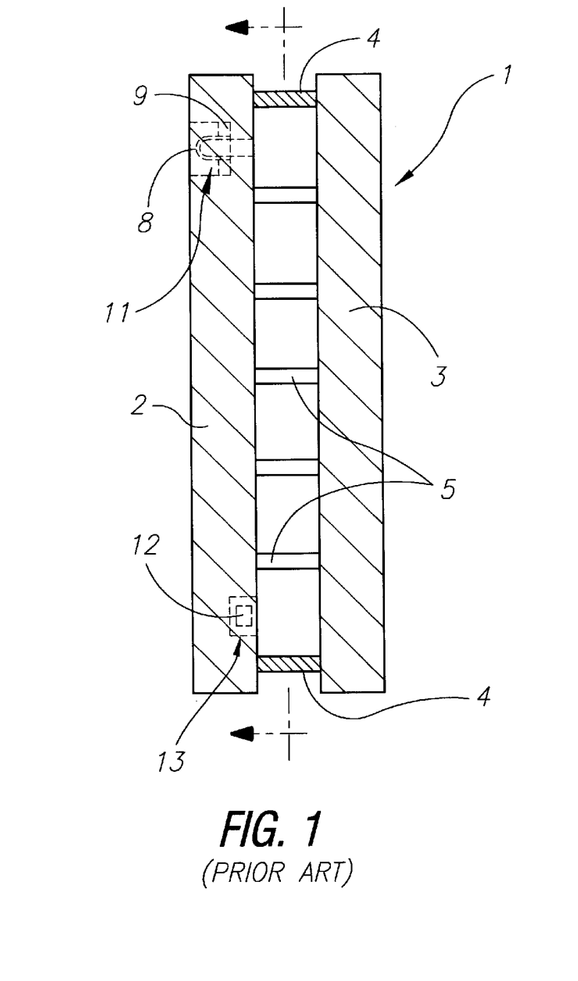
FIG. 1 is a prior art cross-sectional view of a conventional vacuum IG unit.
Figure 2:
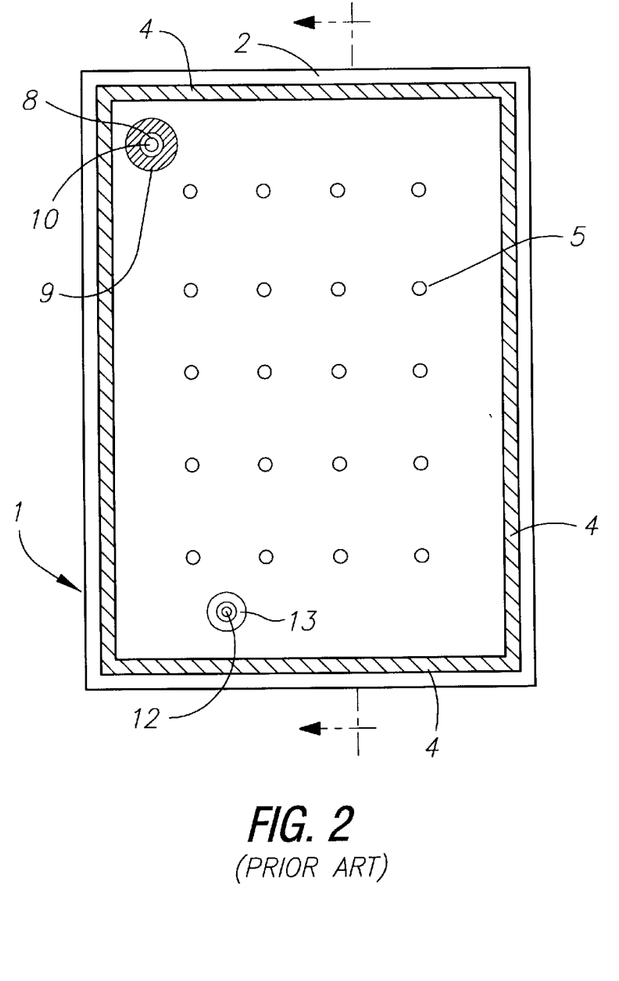
FIG. 2 is a prior art top plan view of the FIG. 1 vacuum IG unit, taken along the section line illustrated in FIG. 1.

Prior art FIGS. 1–2 illustrate a conventional vacuum IG unit. IG unit 1 includes two spaced apart sheets of glass 2 and 3 which enclose a vacuumed or low pressure space therebetween. Glass sheets 2 and 3 are interconnected by peripheral seal of fused solder 4 and an array of support pillars 5.

Pump out tube 8 is hermetically sealed by fused solder glass 9 to an aperture or hole 10 which passes from an interior surface of glass sheet 2 to the bottom of recess 11 in the exterior face of sheet 2. Recess 11 allows pump out tube 8 to be melted and sealed leaving a stub which does not protrude beyond the plane of the exterior face of sheet 2. When sheets 2, 3 and peripheral/edge seal 4 are in place, prior to the tube being sealed, a vacuum is attached to pump out tube 8 so that the interior cavity between sheets 2 and 3 can be vacuumed out to create a low pressure area. Chemical getter 12 may optionally be included within a machined recess 13 in one of the glass sheets of the IG unit to counteract any rise in pressure due to out-gassing.

Figure 3:
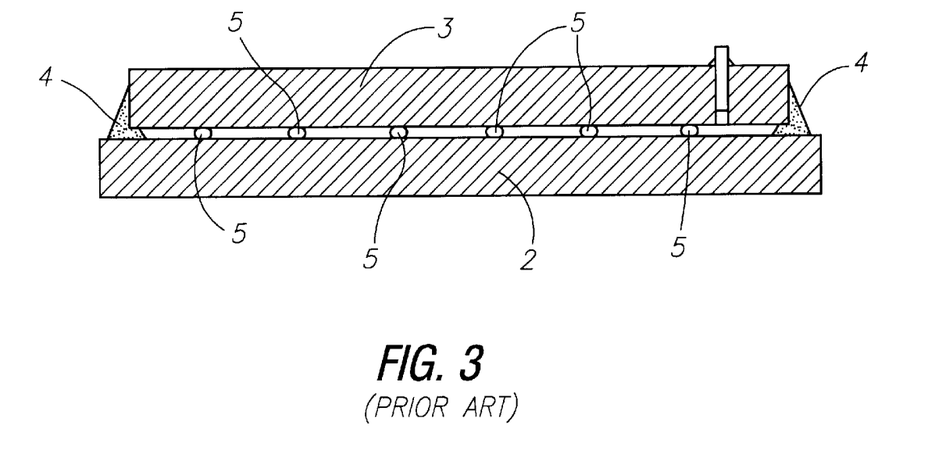
FIG. 3 is a prior art cross-sectional view of another conventional vacuum IG unit.

FIG. 3 is a side cross sectional view of another conventional vacuum IG unit, including support pillars 5 disposed between opposing glass substrates 2 and 3. The periphery of the unit is hermetically sealed by edge seal 4 of fused solder glass.

Pillars are in contact with opposing glass substrates 2 and 3, as shown in FIGS. 1–3. However, the heating of one substrate to a temperature greater than the other may cause pillar(s) to scratch and/or crack one of the glass substrates. For example, when substrate 3 is heated (e.g. a hot object is placed on substrate 3 or it is exposed to direct sunlight), the heated substrate 3 may expand as a function of temperature and the other substrate 2 (which is not heated as much) may not expand at all or not to the same degree. This results in the substrate(s) sliding or moving relative to one another when one expands more than the other. Such relative movement or sliding may cause pillar(s) 5 to dig into, scratch, or crack one or both of glass substrates 2, 3. This weakens the glass and the vacuum IG unit as a whole, and may also create aesthetic problems.

U.S. Pat. No. 5,124,185, incorporated herein by reference, discloses an IG unit including support pillars located between opposing substrates. Each pillar is adhesively secured to one of the substrates, with the opposite side of each pillar having a Teflon (trademark) coating thereon. Unfortunately, because each pillar is secured to one of the substrates, relative movement of the glass substrates may cause pillar(s) to dig into, scratch, and/or crack a glass substrate. The pillars cannot slide relative to both substrates.

In view of the above, there exists a need in the art for pillars less likely to scratch substrate(s) of a vacuum IG unit when the opposing substrates are subjected to relative movement, and/or a need for pillars that will minimize or reduce the severity of scratching and/or cracking of vacuum IG glass substrates.

It is a purpose of this invention to fulfill any or all of the above described needs in the art, as well as other needs which will become apparent to the skilled artisan from the following detailed description of this invention.

SUMMARY OF THE INVENTION

An object of this invention is to provide a vacuum IG window unit where opposing glass substrates can slide or move relative to one another over a pillar(s) designed to minimize cracking and/or scratching of such substrate(s)

Another object of this invention is to provide a support pillar for use in a vacuum IG unit wherein the pillar is at least partially coated with a low friction material of or including diamond like carbon (DLC).

Generally speaking, this invention fulfills certain of the above mentioned needs in the art by providing a thermally insulating glass panel comprising:

first and second spaced apart glass substrates enclosing a low pressure space therebetween;

a hermetic peripheral seal interconnecting said first and second spaced apart glass substrates so as to hermetically seal said low pressure space between said substrates; and at least one supporting pillar disposed in said low pressure space between said first and second substrates, and wherein said pillar includes a core that is at least partially coated with a dry lubricant coating that includes diamond-like carbon.

This invention further fulfills certain of the above described needs in the art by providing a thermal insulating panel comprising:

first and second glass substrates spaced from one another so as to define a low pressure space therebetween, said low pressure space having a pressure less than atmospheric pressure so as to improve thermal insulating characteristics of the window unit;

a seal disposed between said substrates sealing said low pressure space from surrounding atmosphere so as to maintain pressure less than atmospheric pressure in said space;

an array of support members disposed in said low pressure space between said substrates, said support members maintaining said low pressure space between said substrates; and wherein said support members each include diamond like carbon so as to minimize scratching or cracking of at least one of the substrates when one of the substrates moves relative to the other substrate.

This invention will now be described with reference to certain embodiments thereof as illustrated in the following drawings.

DETAILED DESCRIPTION OF CERTAIN EMBODIMENTS OF THIS INVENTION

Referring now more particularly to the accompanying drawings in which like reference numerals indicate like parts throughout the several views.

Certain embodiments of this invention relate to an improved support pillar 21 for use in a multiple glazing thermally insulating window unit, and a method of making the same. Pillars or support members 21 of any of FIGS. 4–6 may be used instead of pillars 5 shown in the conventional insulating glass (IG) units of FIGS. 1–3. In preferred embodiments, pillars 21 are used to support the opposing approximately flat and parallel glass substrates 2, 3 in a vacuum IG unit. However, in alternative embodiments, pillars 21 may be provided in other types of multiple glazing window units.

In certain embodiments of this invention, each pillar 21 includes a core that is at least partially coated with a dry lubricant material such as diamond-like carbon (DLC). Coating 29 eliminates and/or minimizes the degree to which either or both of glass substrates 2, 3 is/are scratched or cracked by pillars when the substrate(s) move relative to one another such as when one is heated to a temperature substantially above the other.

Figure 4:
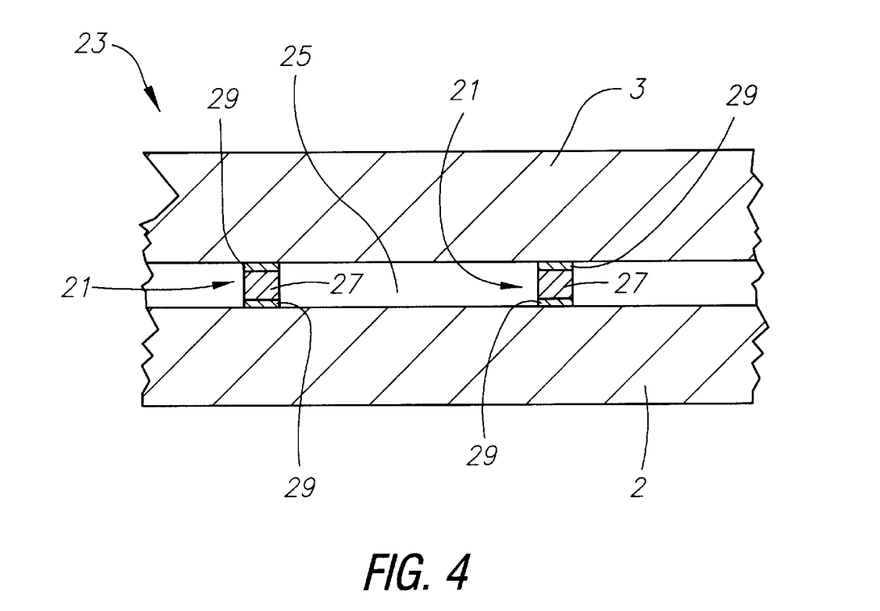
FIG. 4 is a side cross-sectional view of a portion of a vacuum IG unit according to an embodiment of this invention.

FIG. 4 is a cross sectional view of a portion of thermally insulating glass panel 23 according to an embodiment of this invention. Because internal or interior space 25 between the opposing approximately flat substrates 2, 3 is at a pressure lower than atmospheric in general, this type of panel is often referred to as a vacuum insulating glass (IG) unit. Vacuum IG unit or panel 23 includes first glass substrate 2, second glass substrate 3, low pressure or evacuated space 25 between substrates 2 and 3, an array of supports or pillars 21 for supporting and spacing substrates 2, 3 from one another, an optional pump out tube (not shown in FIG. 4) disposed in a hole or aperture formed in substrate 2 for evacuating out space 25, and peripheral or edge seal (see FIGS. 1–3) that hermetically seals low pressure space or cavity 25 between substrates 2, 3. The hermetic edge seal prevents air from entering space 25 and keeps the vacuum or low pressure therein. Space 25 between the glass sheets 2 and 3 is preferably from about 0.10 to 0.30 mm thick.

IG window units 23 according to different embodiments of this invention may be used as residential or commercial windows. The evacuation of space 25 significantly reduces heat transport between glass substrates 2 and 3 due to gaseous conduction and convection. In addition, radiative heat transport between glass sheets 2 and 3 can be reduced to a low level by providing a low emittance (low-E) coating (s) on the internal surface of one or both of sheets 2, 3 (e.g. see the low-E coating on the interior surface of sheet 3 in FIG. 3). High levels of thermal insulation can be achieved due to the evacuation of space 25 with or without a low-E coating being utilized.

Preferably, the pressure in space 25 is at a level below about $10^{-2}$ Torr, more preferably below about 1.0 mTorr, or $10^{-3}$ Torr, and most preferably below about $10^{-6}$ Torr. To maintain such low pressures, the internal surfaces of glass substrates 2 and 3 are adequately outgassed, and areas near the edges or peripheries of substrates 2, 3 are hermetically sealed together.

In certain embodiments of this invention, a pump out tube may be used to evacuate space 25 to create a lower than atmospheric pressure therein, while in other embodiments no pump out tube is used and the IG unit is assembled or put together in a low pressure or vacuum chamber to create the lower pressure in space 25.

An array of small, high strength support pillars 21 is provided between substrates 2 and 3 in order to maintain separation of the two approximately parallel glass sheets 2, 3 against atmospheric pressure. Pillars 21 result in stress concentrations in glass 2, 3 and provide thermal contact between the glass sheets 2, 3, thereby decreasing thermal insulation of the unit. It is desirable for pillars 21 to be sufficiently small so that they are visibly unobtrusive. It is also desirable that pillars 21 be constructed so that they enable substrate(s) 2 and/or 3 to move relative to one another without pillars significantly scratching or cracking either of the substrate(s). In certain embodiments, each pillar 21 has a height of from about 0.10 to 0.30 mm. Pillars 21 may be arranged in a suitable array in space 25, and may be of any geometric shape, disclosed in U.S. Pat. No. 5,664,395, incorporated herein by reference.

In certain embodiments of this invention, referring to FIGS. 4–5, support pillars 21 include a central core 27 that is coated with a dry lubricant coating 29 on one or multiple exterior surfaces thereof.

Core 27 may include or be made of ceramic or metal in different embodiments of this invention as discussed in either of the aforesaid 5,664,395 or 5,657,607 patents, incorporated herein by reference. Pillar core 27 may include or be made of zirconium dioxide, alumina, tantalum (Ta), molybdenum (Mo), hardened tungsten, nickel-chrome alloys (i.e. Inconel), glass, stainless steel, carbides, or combinations of any of the above materials. Other ceramic or metal materials having similar supportive and strength characteristics may also be used for core 27 of pillars 21.

Dry lubricant or low friction coating 29 is provided over at least a portion of core 27. In certain embodiments, coating 29 is made of or includes diamond like carbon (DLC). This low friction material enables each pillar 21 to slide relative to an adjacent glass substrate 2, 3 that is moving relative to the other or opposing glass substrate. Substrates 2, 3 may slide relative to one another, and pillars 21 may slide relative to both substrates in certain embodiments due to low-friction coating 29.

Coating 29 is preferably provided on core 27 in all areas of the pillar that contact a glass substrate 2, 3. "Contact" means both direct contact as shown in FIGS. 1–2 and 4, as well as indirect contact as shown in FIG. 3 where a low-E or other coating is provided between the pillar and substrate. Coating is from about 500 Å to 3 μm thick in certain embodiments, more preferably from about 1 to 2 μm thick. In certain embodiments, coating 29 is substantially transparent to visible light and has a refractive index of from about 1.5 to 2.2.

Figure 5A:
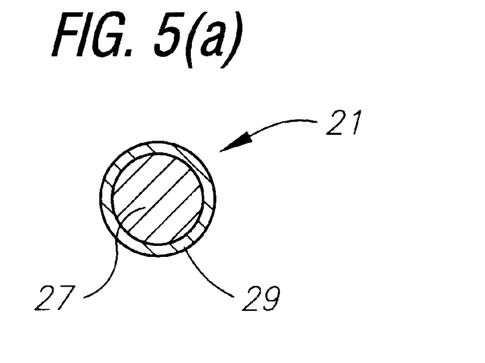
FIG. 5(a) is a side cross sectional view (through the middle of a pillar) illustrating a round or oval pillar according to an embodiment of this invention that may be used instead of the pillars shown in FIG. 4.
Figure 5B:
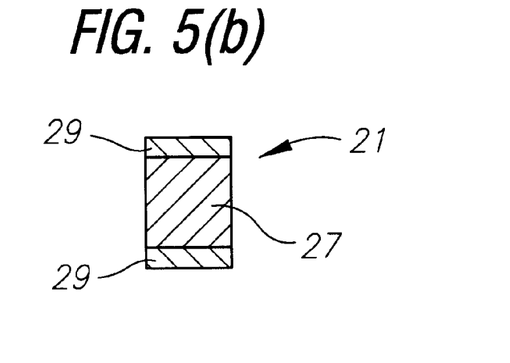
FIG. 5(b) is a side cross sectional view (through the middle of a pillar) illustrating the square or rectangular pillar of the FIG. 4 embodiment.

In the FIG. 4 and 5(b) embodiment, pillar 21 is square or rectangular in shape, with only two of the pillar's six planar surfaces being coated with low friction material 29. In other words, only the top and bottom planar surfaces of the pillar core 27 in this embodiment are coated. In certain embodiments, it is possible for only one of the six planar pillar surfaces to be coated 29 (e.g. the pillar surface adjacent substrate 2), while in other embodiments three or more of the planar surfaces may be coated.

Referring to FIG. 4, the pillar has a first approximately planar surface adjacent and parallel to the first substrate and a second approximately planar surface adjacent and parallel to the second substrate, these first and second approximately planar surfaces being approximately parallel to one another. In certain preferred embodiments, the first and second parallel approximately planar surfaces of the pillar include the dry lubricant coating 29 that includes diamond-like carbon.

FIG. 5(a) is a cross sectional view of a pillar 21 according to another embodiment wherein the pillar 21 and pillar core 27 are round, spherical, ellipsoid, flattened spheres, or oval, and coating 29 is provided over the entire outer surface of core 27.

Figure 5C:
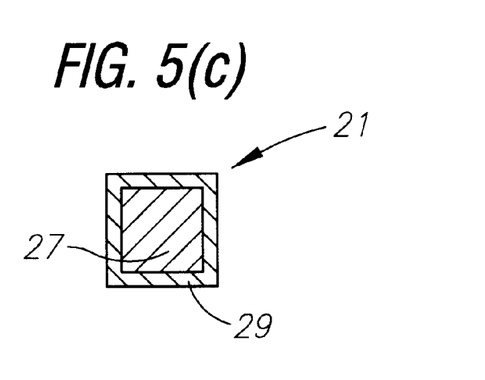
FIG. 5(c) is a side cross sectional view (through the middle of a pillar) illustrating a square or rectangular pillar according to an embodiment of this invention with all sides coated that may be used instead of the pillars shown in FIG. 4.
Figure 6:
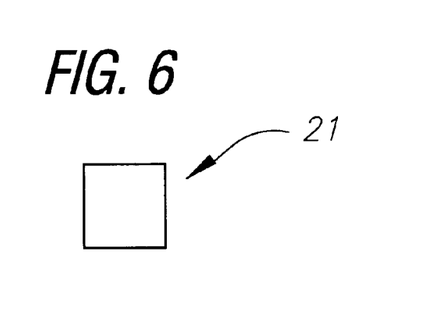
FIG. 6 is a top plan view of the pillars of FIGS. 4 and 5(b), illustrating that when viewed from above the pillars are rectangular in shape.

FIG. 5(c) is a cross sectional view of a pillar 21 according to another embodiment of this invention, wherein core 27 is square or rectangular, and coating 29 is provided over the entire exterior of the core (i.e. all six planar surfaces of the core are coated). FIG. 6 is a top view of pillar 21 of either the FIG. 5(b) embodiment or the FIG. 5(c) embodiment.

Figure 5D:
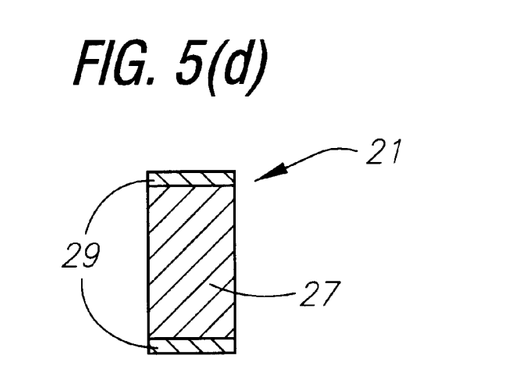
FIG. 5(d) is a side cross sectional view (through the middle of a pillar) illustrating a cylindrical-shaped pillar according to an embodiment of this invention that may be used instead of the pillars shown in FIG. 4.

FIG. 5(d) is a side cross sectional view of a pillar 21 according to another embodiment of this invention, wherein core 27 and pillar 21 are cylindrical in shape (a top view of this pillar 21 would illustrate a circular body). In cylindrical pillar 21 embodiments, the top and/or bottom planar surfaces may be coated 29 as shown in FIG. 5(d), or alternatively the entire core 27 may be coated with low friction material 29.

Pillars 21 from any of the FIG. 5(a), 5(b), 5(c), or 5(d) embodiments may be used as pillars 21 in vacuum IG units 23 according to different embodiments of this invention. In still other embodiments, entire pillars may be made or formed of DLC.

According to certain embodiments of this invention, the glass used for substrates 2 and 3 is soda lime silica glass, comprising by weight 70–74% silicon oxide, 12–16% by weight sodium oxide, 7–12% lime (CaO), 0–5% MgO, 0–5% alumina, and 0–0.20% iron oxide. Any other type of glass (e.g. borosilicate) may also be used. Colored or clear glass may be used. These glasses may be (i) thermally tempered, (ii) chemically tempered, or (iii) annealed and not tempered, according to different embodiments of this invention. In certain embodiments, glass sheets 2 and/or 3 may be from about 1 to 4.5 mm thick each, preferably from about 2–3 mm thick each. However, when tempered, thinner glass sheets 2, 3 may be used (e.g. from about 1 to 3 mm thick, more preferably from about 1.7 to 2.3 mm thick). The use of thinner glass substrates 2, 3 provides for improved thermal behavior (e.g. reduced edge conduction) as edge conduction of heat is proportional to glass thickness.

Figure 7:
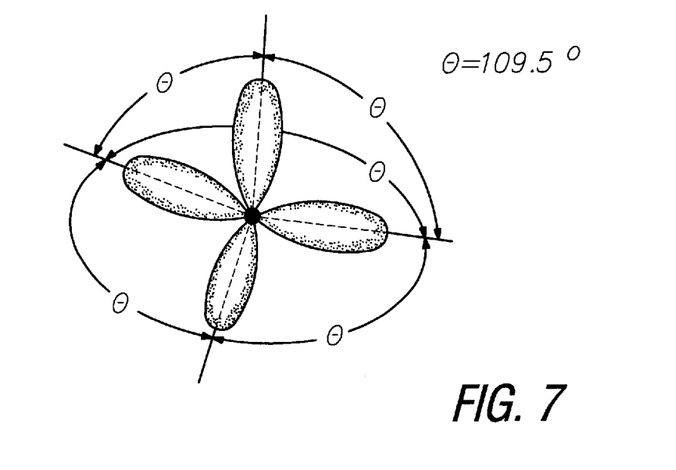
FIG. 7 illustrates an exemplar $sp^3$ carbon atom hybridization bond in a DLC coating layer according to certain embodiments of this invention.
Figure 8:
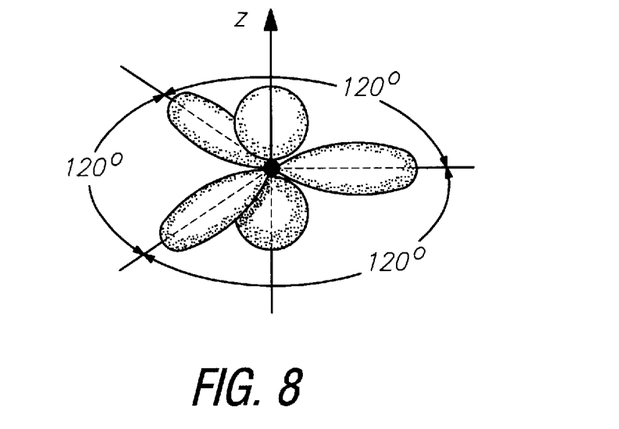
FIG. 8 illustrates an exemplar $sp^2$ carbon atom hybridization bond in a DLC coating layer according to certain embodiments of this invention.
Figure 9:
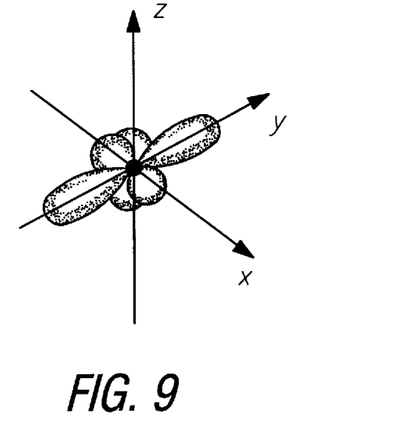
FIG. 9 illustrates exemplar sp hybridization of a carbon atom.

FIG. 7 illustrates an exemplar $sp^3$ carbon atom hybridization bond in a DLC coating 29 according to certain embodiments of this invention. FIG. 8 illustrates an exemplar $sp^2$ carbon atom hybridization bond in a DLC coating 29 according to certain embodiments of this invention. Both of the FIGS. 7 and 8 type carbon-carbon (C—C) bonds may be provided in coatings 29 herein. In certain embodiments, coating 29 may include at least about 50% of the FIG. 8 type bonds, preferably at least about 80% of these type bonds. However, in other embodiments, coating 29 may include a substantial percentage of the tetrahedral amorphous carbon bonds ($sp^3$) of FIG. 7. Coating 29 may be amorphous, as opposed to crystalline, in either case. While amorphous DLC coatings 29 are preferred, crystalline DLC coating are also possible.

Diamond-like carbon (DLC) 29 utilized in certain embodiments herein will now be described in detail. DLC 29 is amorphous in certain embodiments, with at least about 50% $sp^2$ carbon-carbon bonds. In other embodiments, amorphous DLC coating 29 may also include carbon-carbon tetrahedral ($sp^3$-type) bonding, having at least 35% $sp^3$ C—C bonds (ta-C), and sometimes at least about 70% $sp^3$ C—C bonds. However, each of the aforesaid types of DLC includes $sp^2$ C—C trigonal bonding and optical and electronic properties of the coating are largely determined by this bonding component. The fraction of $sp^2$ bonding, and thus the density, in a DLC layer depends for example on the carbon ion energy used during deposition of coating 29. Properties of a given DLC coating are a function of the fraction of $sp^3$ to $sp^2$ bonding throughout the coating. Different percentages and/or ratios of these types of carbon-carbon (i.e. C—C) bonds may be used in different embodiments herein. Different coatings 29 herein may be entirely of DLC, or alternatively partially of DLC. When coating 29 is only partially of DLC, in certain preferred embodiments the coating is at least 30% by weight of DLC.

Depending on the technique of deposition, certain DLC layers 29 herein may contain amounts of H (e.g. up to about 40%) which induces the C atom to take either a tetrahedral $sp^3$ configuration in low H amounts ($\leq 5\%$) or to be sp-hybridized within a polymeric-like form as the percentage of H increases above about 25%. In other words C—C, C–H and H—H correlations all contribute to the average structure of different coatings 29 in certain embodiments of this invention. The spatial distribution of trigonal ($sp^2$) and tetrahedral carbon atoms may determine the bonding strength of layer(s) 29 to the pillar core, as well as the coating's density, strength, stress, etc.

DLC inclusive coating 29 has a density of at least about 1.5 grams per cubic centimeter ($gm/cm^3$) in certain embodiments (more preferably at least about 2.0 grams per cubic centimeter (e.g. about 2.7)). Other characteristics of different DLC coatings 29 for certain embodiments are shown below in Table 1.

TABLE 1

| Properties | c-Diamond | ta-C | ta-C:H (10% at H) |
|---|---|---|---|
| Bandgap (eV) | 5.45 | 2.0 | 2.2–2.5 |
| Breakdown voltage (V cm-1) 10^5 | 100 | 25–35 | 30 |

TABLE 1-continued

| Properties | c-Diamond | ta-C | ta-C:H (10% at H) |
|---|---|---|---|
| Dielectric Constant | 5.5 | 4.5 | 4.7 |
| Resistivity (ohm-cm) | $10^{18}$ | $10^{11}$ | $10^{12}$ |
| Thermal Conductivity ($Wcm^{-1}K^{-1}$) | 20 | 0.1 | 0.1 |
| Young's modulus Gpa | 1000 | 700–800 | 500 |
| Hardness (Gpa) | 100 | 30–80 | 5–80 |
| Refractive index | 2.4 | 2.0 | 1.6–1.9 |
| Structure | crystalline | amorphous | amorphous |
| Deposition condition/rate | high temp CVD 0.1 um/hr | low temp <200° C. 20A/s | low temp <200° C. |
| wetability | | contact angle 5 to 50 | |
| Max thickness | >1 um | <200 nm stress limited | <200 nm |
| Coefficient of Friction | <0.2 single crystal | <0.1 | <0.1 |

DLC coating 29 may be formed on core 27 in a number of different manners according to different embodiments of this invention. Plasma ion beam deposition is one preferred method. In plasma ion beam embodiments for depositing coatings 29, carbon ions may be energized to form a stream from plasma toward core 27 so that carbon from the ions is deposited on the core. An ion beam from gas phase produces a beam of C+, CH+, $C_2H$, and/or $C_2H_2$+ ions (i.e. carbon or carbon based radicals). Preferably, acetylene feedstock gas ($C_2H_2$) is used to prevent or minimize polymerization and to obtain an appropriate energy to allow the ions to penetrate the core surface and subimplant therein, thereby causing coating atoms to intermix with the surface of the core 27 a few atom layers thereinto. This improves adhesion of the subsequent layer of or including DLC. Impact energy of ions for the bulk of coating 29 may be from about 100–1,000 eV (most preferably from about 300 to 800 eV), to cause mostly $sp^2$ C—C bonds to form in the DLC coating. The impact energy of the energetic carbon ions may be within a range to promote formation of desired lattice structure. The stream may be optionally composed of ions is having approximately uniform weight, so that impact energy will be approximately uniform. Effectively, the energetic ions impact on the growing surface and are driven into the growing film and/or core to cause densification.

High stress is undesirable in the thin interfacing portion of coating 29 that directly contacts the surface of core 27. Thus, for example, the first 1–20% thickness of coating 29 is deposited on the core using high anti-stress energy levels of from about 200–1,000 eV, preferably from about 400–500 eV. Then, after this initial interfacing portion of coating 29 has been grown, the ion energy in the ion deposition process may be maintained at this level or alternatively decreased (either quickly or gradually while deposition continues) to about 100–400 eV to grow the remainder of coating 29. However, at least the final portion of coating 29 deposited has the desired dry lubricant characteristics discussed above.

In certain embodiments, $CH_4$ may be used as a feedstock gas during the deposition process instead of or in combination with the aforesaid $C_2H_2$ gas. Other Alkanes may instead be used or other hydrocarbons.

It is noted that the outer surface of core 27 may have tiny cracks or microcracks defined therein. These cracks may weaken the core depending on what material the core is made of (e.g. glass, metal, ceramic, etc.). Thus, another advantage of this invention is that in certain embodiments amorphous carbon atoms and/or networks of coating 29 fill in or collect in these small cracks because of the small size of carbon atoms (e.g. less than about 100 pm radius atomic, most preferably less than about 80 pm, and most preferably about 76.7 pm) and because of the ion energy of 200 to 1,000 eV, preferably about 400–500 eV, and momentum. This may increase the mechanical strength of the pillar.

In alternative embodiments of this invention, low friction or dry lubricant coating 29 may be made of or include indium (In). In some embodiments, coating 29 may be made of or include material including at least about 20% by weight indium, more preferably at least about 50%, and most preferably at least about 80% indium. In certain embodiments, the coating may be made of or include material having at least about 50% indium, at least about 5% silver, and at least about 10% lead. In other preferred embodiments, the material is obtained from "Indium Corporation of America" and may be (i) pure indium (In); (ii) about 80% indium, about 5% silver (Ag), and about 15% lead (Pb); (iii) about 85% indium, about 5% Ag, and about 10% Pb; or (iv) a combination of indium and bismuth alloy (e.g. about 40% Bi and about 60% In). In still other embodiments, coating 29 may be of other materials having low friction and/or friction coefficient properties capable of minimizing substrate scratching and/or cracking.

In some embodiments, a tungsten disulfide ($WS_2$) coating may be provided over top of some or all of the DLC inclusive layer(s) herein.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel comprising:
   first and second spaced apart glass substrates enclosing a low pressure space therebetween;
   a hermetic seal interconnecting said first and second spaced apart glass substrates so as to hermetically seal said low pressure space between said substrates;
   at least one supporting spacer disposed in said low pressure space between said first and second substrates, wherein said spacer includes a core that is at least partially coated with a hard dry lubricant coating including diamond-like carbon;
   wherein no side of said spacer is anchored or affixed to either of said glass substrates; and
   wherein said hard dry lubricant coating has an average hardness of from 5 to 80 GPa.

2. The thermally insulating glass panel of claim 1, wherein said first and second substrates are soda lime silica glass substrates, and said substrates are substantially parallel to one another.

3. The thermally insulating glass panel of claim 1, wherein said spacer has a first approximately planar surface adjacent said first substrate and a second approximately planar surface adjacent said second substrate, and wherein said first and second approximately planar surfaces are approximately parallel to one another.

4. The thermally insulating glass panel of claim 3, wherein said first and second approximately planar surfaces of said spacer each include said dry lubricant coating that includes diamond-like carbon.

5. The thermally insulating glass panel of claim 1, wherein said spacer is approximately shaped in a form of one of a square, a rectangle, a sphere, an oval, and a cylinder.

6. The thermally insulating glass panel of claim 1, wherein said coating is from about 500 Å to 3 µm thick.

7. The thermally insulating glass panel of claim 6, wherein said coating is from about 1 to 2 µm thick.

8. The thermally insulating glass panel of claim 1, wherein said core is of a material consisting essentially of one of zirconium dioxide, alumina oxide, tantalum (Ta), molybdenum (Mo), hardened tungsten, chrome, stainless steel, and carbide.

9. The thermally insulating glass panel of claim 1, wherein said core includes at least one of zirconium dioxide, alumina oxide, tantalum (Ta), molybdenum (Mo), hardened tungsten, chrome, stainless steel, and carbide.

10. The thermally insulating glass panel of claim 1, wherein said diamond like carbon includes at least about 50% $sp^2$ carbon-carbon bonds.

11. The thermally insulating glass panel of claim 1, wherein said spacer has a first approximately planar surface adjacent said first substrate and a second approximately planar surface adjacent said second substrate, and wherein said first and second approximately planar surfaces are approximately parallel to one another.

12. The thermally insulating glass panel of claim 1, wherein said coating has a surface coefficient of friction of less than or equal to about 0.1.

13. A thermally insulating glass panel comprising:

first and second spaced apart glass substrates enclosing a low pressure space therebetween;

a seal interconnecting said first and second spaced apart glass substrates so as to seal said low pressure space between said substrates; and an array of support members disposed in said low pressure space between said first and second substrates for spacing said substrates from one another, wherein a plurality of said support members include a core that is at least partially coated with a dry lubricant coating, and wherein said dry lubricant coating includes at least about 50% by weight indium.

14. A support spacer for location between glass substrates of a vacuum IG unit, the support spacer comprising:

a core having first and second approximately planar surfaces that are substantially parallel to one another, and wherein said core includes one of (i) metal, (ii) ceramic, and (iii) glass; and a low-friction coating provided on each of said first and second approximately planar surfaces of said core, where said coating includes diamond-like carbon with hardness of from 5–80 GPa, and wherein said spacer is not adapted to be anchored to either of said glass substrates.

15. The spacer of claim 14, wherein said coating includes at least about 30% diamond-like carbon and is from about 500 Å to 3 µm thick.

16. The panel of claim 1, wherein at least 35% of the carbon-carbon (C—C) bonds in said coating are $sp^3$ carbon-carbon bonds.

17. The panel of claim 1, wherein said diamond-like carbon is hydrogenated, and includes up to about 40% hydrogen (H).

* * * * *